United States Patent [19]

Kan

[11] 3,715,731

[45] Feb. 6, 1973

[54] MICROFILM PLOTTER SYSTEM

[75] Inventor: Philip T. Kan, Reseda, Calif.

[73] Assignee: Computer Industries, Inc., Van Nuys, Calif.

[22] Filed: March 16, 1970

[21] Appl. No.: 19,589

[52] U.S. Cl. .................................... 340/172.5, 95/4.5

[51] Int. Cl. ............................ G06f 9/00, G05b 19/18

[58] Field of Search ...340/172.5; 95/4.5; 235/151.11

[56] References Cited

UNITED STATES PATENTS

| | | | |
|---|---|---|---|
| 3,199,111 | 8/1965 | Jennings et al. | 340/172.5 X |
| 3,297,929 | 1/1967 | Gardner et al. | 235/151 U X |
| 3,325,786 | 6/1967 | Shashoua et al. | 340/172.5 |
| 3,348,229 | 10/1967 | Freas | 340/172.5 X |
| 3,365,702 | 1/1968 | Heatwole | 340/172.5 |
| 3,434,113 | 3/1969 | Wiley et al. | 340/172.5 |
| 3,465,295 | 9/1969 | Witt et al. | 340/172.5 |
| 3,504,609 | 4/1970 | Donald | 95/4.5 |
| 3,540,361 | 11/1970 | Schira | 95/4.5 |
| 3,544,972 | 12/1970 | Trousdale | 340/172.5 |
| 3,553,676 | 1/1971 | Raciti | 95/4.5 |

*Primary Examiner*—Paul J. Henon
*Assistant Examiner*—Paul R. Woods
*Attorney*—Jessup & Beecher

[57] ABSTRACT

The present invention relates to an improved digital incremental plotter system of the microfilm type, and it relates more particularly to such a system in which information to be plotted and recorded on microfilm may be derived from an associated digital computer in the form of a series of instructions, either directly on-line, or in an off-line system from punched cards, punched paper tape, magnetic tape, or the like.

5 Claims, 14 Drawing Figures

INVENTOR:
Philip Kan
Jessup and Beecher
By Warren T. Jessup
ATTORNEYS

INVENTOR
Philip Kan
Jessup and Beecher
By Warren T. Jessup
ATTORNEYS

INVENTOR:
Philip Kan
Jessup and Beecher
By Warren T. Jessup
ATTORNEYS

INVENTOR:
Philip Kan
Jamp and Beecher
By Keith D. Beecher
ATTORNEYS

INVENTOR:
Philip Kam
Jessup and Beecher

By Warren T. Jessup
ATTORNEYS

INVENTOR
Philip Kan
Jessup and Beecher
By Warren T. Jessup
ATTORNEYS

INVENTOR:
Philip Kan
Jessup and Beecher
By Warren T. Jessup
ATTORNEYS

PATENTED FEB 6 1973

3,715,731

SHEET 08 OF 12

INVENTOR:
Philip Kan
Jessup and Beecher
By Warren T. Jessup
ATTORNEYS

INVENTOR:
Philip Kan
Jessup and Beecher
By Warren T. Jessup
ATTORNEYS

'N' Counter Outputs

INVENTOR:
Philip Kan
Jessup and Beecher
By Warren T. Jessup
ATTORNEYS

INVENTOR:
Philip Kan
By Warren T. Jessup
ATTORNEYS

MICROFILM PLOTTER SYSTEM

BACKGROUND OF THE INVENTION

A digital incremental plotter system is described in copending application Ser. No. 628,923, filed Apr. 6, 1967, now U.S. Pat. No. 3,636,314, in which an electronic system responds to binary coded input signals to provide appropriate incremental plotting control output signals.

The particular system of the copending application is described as controlling a high speed digital incremental plotter, the plotter producing the desired plot by movement of a pen over a recording paper. In such a plotter, for example, the pen is moved along a first (Y) axis, and the paper is moved along a second (X) axis which is usually perpendicular to the first axis. In this way, the Y-axis plot is produced by lateral movement of the pen, and the X-axis plot is produced by lateral movement of the recording paper. Discontinuous lines, or Z-axis plots, may be achieved by means of a pen solenoid which moves the pen into or out of contact with the paper whenever the solenoid is energized or de-energized.

In the microfilm system of the present invention, the incremental output signals from the system are used to control a cathode-ray tube, and the plot is produced on the screen of the cathode-ray tube and photographed in successive frames by a usual microfilm camera. The control of the cathode-ray tube is such that the beam is moved along a first axis (Y) by a first set of incremental output signals, and along a second axis (X) by a second series of incremental output signals. The cathode-ray beam in the tube is selectively blanked by a third set of incremental output signals (Z-axis).

Although the digital incremental plotting system to be described may be directly coupled to a digital computer to provide a microfilm record of the output of the computer, the system will be described in an off-line environment, and receiving its information from a magnetic tape storage system. As described in the copending application, the output from the computer, for example, may be recorded on the magnetic tape, or on punched paper tape, or the like, and the tape or equivalent is then used to control the incremental plotting system in a succession of X, Y and Z incremental plotting operations.

With such an off-line operation, the instructions from the computer for controlling the plotter are recorded in a succession of X, Y and Z incremental groups on the magnetic tape in the storage system. The successive groups of instructions make up different blocks pertaining to different sets of output information to be plotted by the microfilm plotting system. These blocks are identified by different address designations.

Therefore, whenever a particular set of output data from the computer is to be plotted, the block of X, Y and Z instructions on the magnetic tape which corresponds to that output data is addressed by the control system of the plotter. Then, when that particular block is reached, the X, Y and Z instructions of the corresponding group of instructions in the block are read successively out from the magnetic tape, and are used to control the plotting system.

The incremental plotting system of the invention, for example, is capable of plotting 127 incremental steps in the X- or Y-direction, or both, in response to a single instruction. When present day magnetic tape is used, which is capable, for example, of storing 800 binary bits per inch, 33 instructions for the incremental plotting system presenting up to 4191 incremental steps for each of the X- and Y-directions, for example, may be contained in each inch of the magnetic tape.

DETAILED DESCRIPTION OF THE ILLUSTRATED EMBODIMENT

Figure 1:
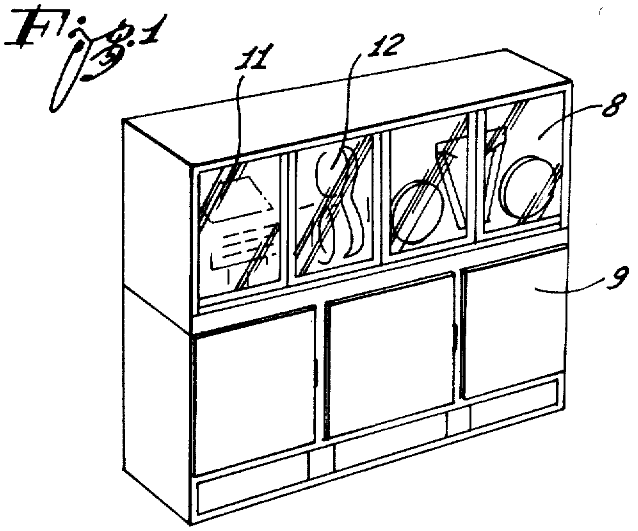
FIG. 1 is a perspective representation of an off-line microfilm plotting system which may incorporate the concepts of the present invention, and in which the various instructions for the plotting system are stored on a magnetic tape, and are subsequently converted to incremental output signals which control a cathode ray tube, the resulting display on the screen of the cathode ray tube being recorded by a microfilm camera on a corresponding series of microfilm frames.

The unit shown in FIG. 1 comprises an incremental microfilm plotting system which, as mentioned above, may incorporate the concepts of the present invention. The system includes a cathode ray tube 11, which is under the control of instructions stored on a magnetic tape storage unit 8. The cathode ray tube 11 responds to the instructions from the storage unit 8, as processed by the incremental plotting system 9, so that the cathode ray beam in the cathode-ray tube 11 is caused to move in the X- and Y-directions in a series of increments, and also is selectively blanked in response to Z-axis increments. The resulting plots appearing in successive frames on the screen of the cathode-ray tube 11 are photographed by a microfilm camera 12, so as to provide a usual microfilm record.

Figure 2A:
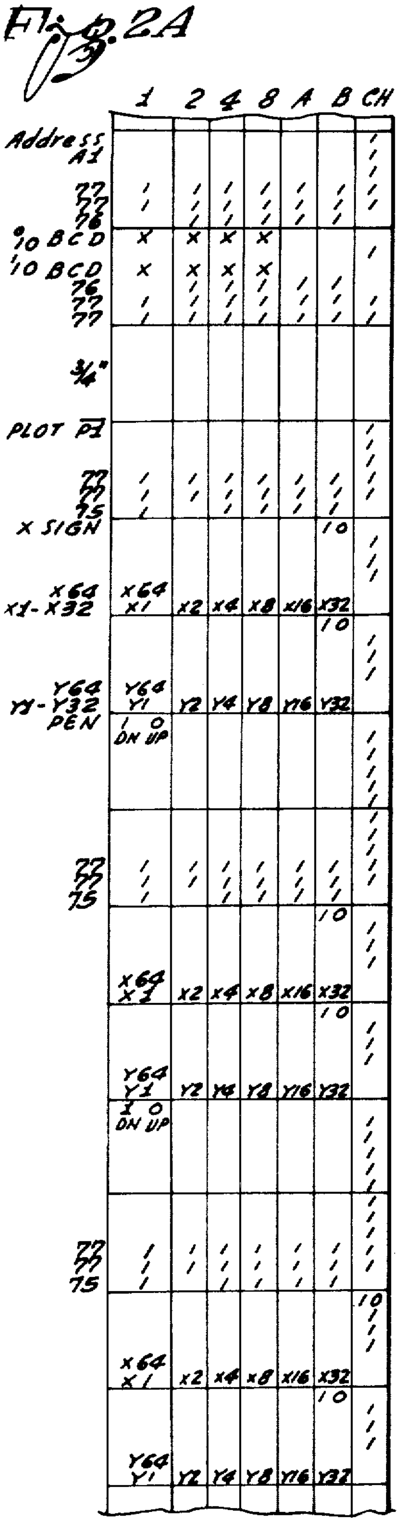
FIG. 2A is a schematic representation showing the manner in which the instructions for the incremental plotting system of the invention may be stored on a magnetic tape.

Under the control of the X-, Y- and Z-axis incremental output signals derived from the plotting system 9 in response to the instructions derived from the magnetic tape storage unit 8, various plots displayed on the screen of the cathode-ray tube 11 are recorded by the microfilm camera 12. As shown in FIG. 2A, the instructions for the plotting system 9, which are derived from an associated data processor (not shown), are first stored on the magnetic tape of FIG. 2A in the tape storage unit 8 of FIG. 1. In the embodiment under consideration, the instructions are recorded on the magnetic tape in six channels plus a parity channel, as a succession of groups of X- , Y- and Z-instructions. Each group is preceded by a distinctive address so that the particular group may be addressed at will, and the plotting system made to respond to the data represented thereby.

In the representation of FIG. 2A, for example, a particular group, or block, of X, Y and Z plot data instructions is shown, the group being preced by an address A1. The tape is always read from the top down in FIG. 2A, when a desired block has been reached. This occurs during a "plot mode," and after the completion of a "search mode." The operation during the search mode is such that the magnetic tape is searched at a relatively high rate in either direction as will be explained, until the desired address is reached. The tape then stops in position so that the group of plot data associated with the desired address may be read. The operator depresses a "plot" button, so as to start the plot mode, and the tape is then read through the particular group or block corresponding to the particular address, and always from the top down in FIG. 2A.

Figure 2B:
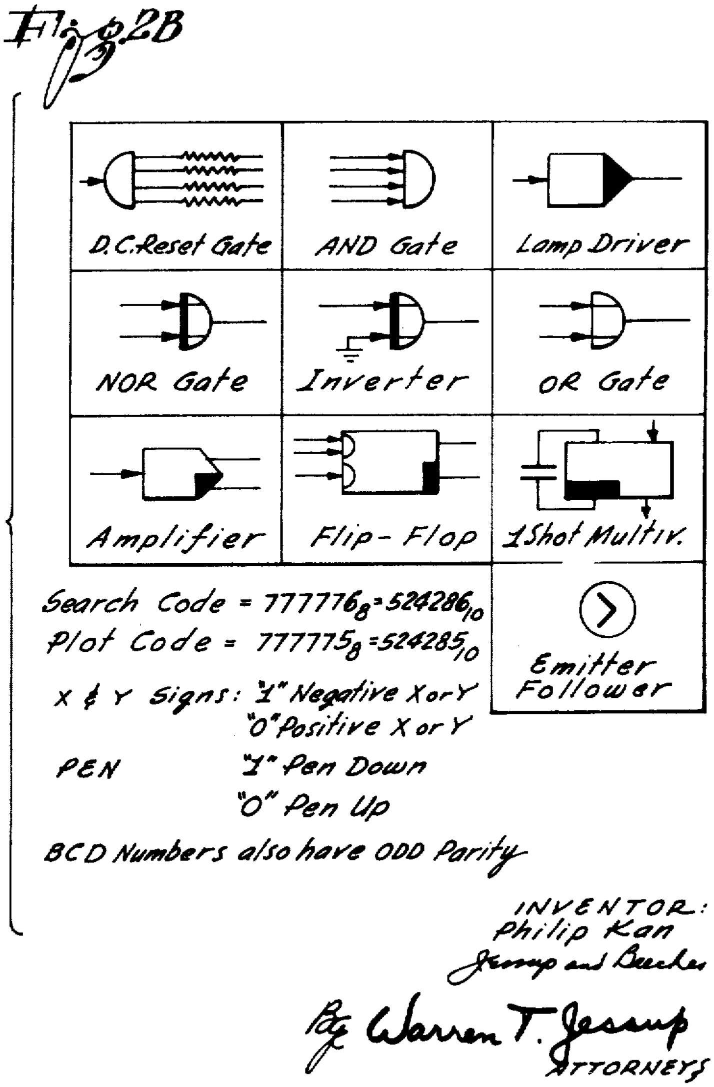
FIG. 2B is a table identifying various logic symbols to be used throughout the present specification, and also listing other information pertaining to the system.

As the seven channels (1, 3, 4, 8, A, B, and CH) are read by seven associated read heads, the octal code 77, 77, 76 is sensed. This announces that the following binary coded information is an address and not data. The address is stored on the tape in two separate characters. These are designated as binary coded decimal (BCD) numbers in FIGS. 2A and 2B. The first number is the "-tens" digit, and the second number is the "ones" digit. In the particular embodiment, therefore, 0–99 different address groups of instructions may be stored on the magnetic tape.

As shown in FIG. 2A, the address is also identified by octal code 77, 77, 76 on the opposite side for reverse direction search. As will be described, whenever a desired address is set into the system, the system will scan the tape to the first address, and then will automatically scan in the direction nearest to the address desired, either forwardly or reverse. Regardless of the direction of scanning, the system will stop once the desired address is reached, and it will then scan down through the address and through the plot data following the address, after the "plot" button has been pushed.

The plot data is identified by octal code 77, 77, 75, as shown in FIG. 2A. A space, for example, of the order of three-fourths inch, is provided between the address and the associated plot data, and a similar space is provided between the end of each group of data and the address of the succeeding group. These spaces constitute gaps in the tape record, and no information is recorded in the gaps. These gaps permit the associated logic circuitry to settle when the system is in the search mode, and before it enters the plot mode.

Each group of plot data on the tape of FIG. 2A is made up of a succession of X- , Y- and Z-instructions, as noted above. For example, after the plot data has been identified by the 77, 77, 75 octal designation, the sign bit of the X-instruction is first sensed (channel B). Then, after a space of three tape characters, the most significant X-bit (X64) is sensed in channel 1. Following that, the remaining six X-bits are sensed simultaneously in channels 1, 2, 4, 8, A and B. The sign bits determine the direction of movement along the X- or Y-axes of the cathode-ray beam in the system of FIG. 3, as will be described.

The aforesaid process is then repeated for the first Y-instruction. For the first Z-instruction, channel 1 is sensed to determine whether the cathode-ray beam is to be blanked or not, for the first X- and Y-instructions. The following eight tape characters are blank to allow space for the magnetic tape unit to stop and start. After reading one instruction, the magnetic tape unit will stop and wait until the incremental plotting system associated with the tape unit commands it to start and read the next instruction. Upon such a command, the scan of the tape moves to the second X- , Y- and Z-instructions, and so on until the end of the particular group of instructions contained within the particular address. In each instance, as shown in FIG. 2A, the computer provides a parity check bit in the CH channel for each tape character.

It should be remembered that each X- and Y-instruction in any particular group of instructions does not represent a single incremental movement of the cathode ray beam. Instead, each X- and Y-instructions is in the form of a binary coded number which represents a corresponding number of incremental movements of the beam which number, for example, 0–127 in the particular embodiment under consideration.

Figure 3:
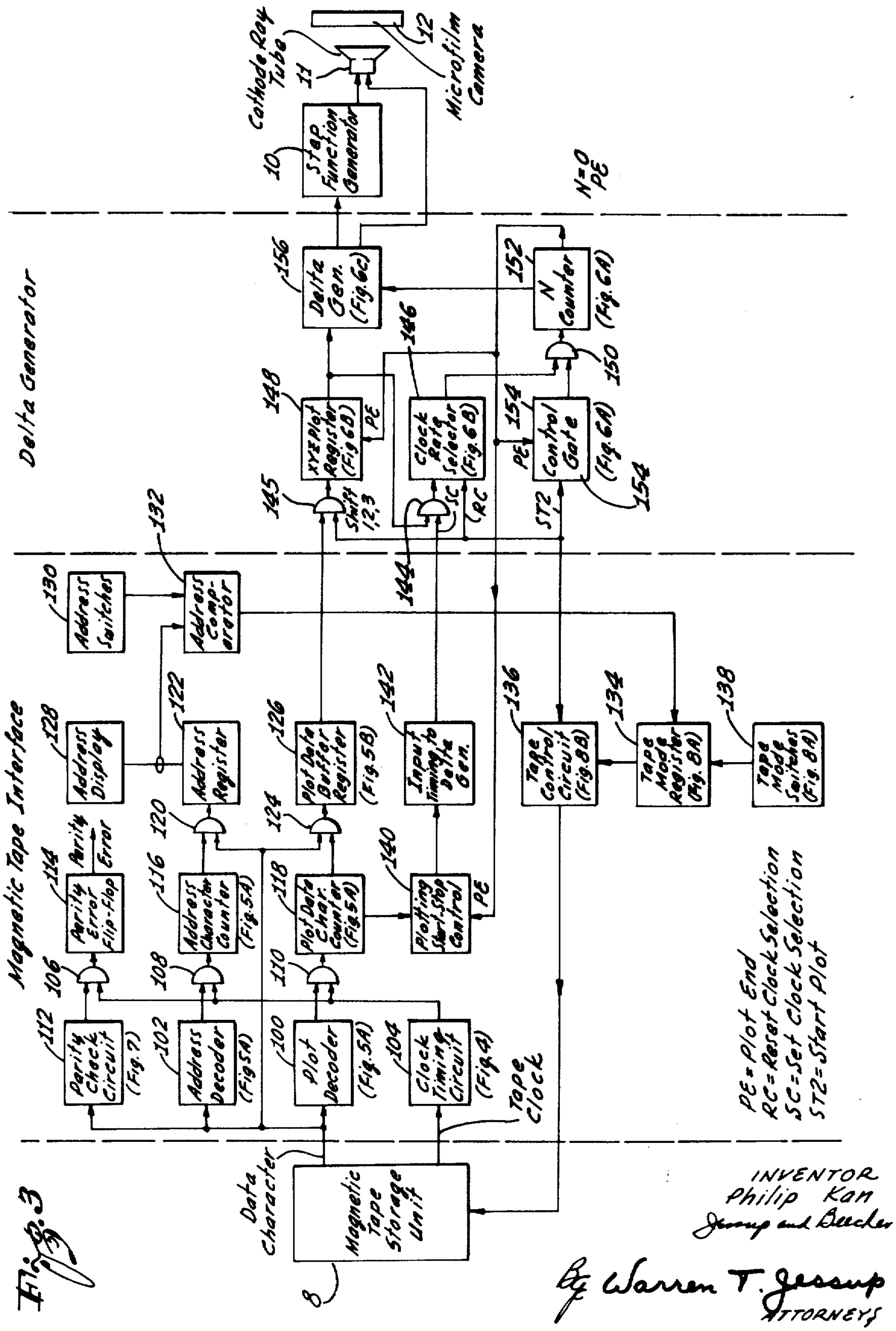
FIG. 3 is a block diagram of an incremental plotting system representative of one embodiment of the invention.

As noted above, the various components which make up the digital plotting system of the invention, in the embodiment to be described herein, are shown in block form in FIG. 3. The various symbols used in FIG. 3, and throughout the present specification are explained in the representations of FIG. 2B.

As the signals are read from the tape, in the sequence described above, they pass from the magnetic storage unit shown in block form in FIG. 3, to a plot decoder 100 and to an address decoder 102. The plot decoder passes the X, Y and Z plot signals in response to the 77, 77, 75 octal identification; whereas, the address decoder 102 passes the address signals in response to the octal 77, 77, 76 identification.

The magnetic tape in the storage unit 8 is also sensed for clock pulses, and a clock pulse is derived for each character of the tape at which data or parity bits appear. These clock pulses are introduced to a clock timing circuit 104 which, as will be described, produces timing signals for the system. The aforesaid timing signals are applied to "and" gates 106, 108 and 110; and they serve to clock the application of data from a parity check circuit 112 to a parity error flip-flop 114, from the address decoder 102 to an address character counter 116, and from the plot decoder 100 to a plot data character counter 118. The address character counter 116 is connected through an "and" gate 120 to an address register 122. The plot data character counter 118 is connected through an "and" gate 124 to a plot data buffer register 126. The derived data from the tape is also introduced to both "and" gate 120 and 124.

It will be appreciated that upon the receipt of an address identification octal code 77, 77, 76; the address decoder 102 causes the address character counter 116 to be activated. The latter counter is timed so that the first character of the corresponding address is initially stored in the address register 122, and then the second character is stored. This causes an address display unit 128 of any appropriate type, for example, a Nixie tube, to display the particular address.

Likewise, upon the receipt of the plot data identification octal code 77, 77, 75, following the address, the plot decoder causes the plot data character counter 118 to be activated so that the plot data characters may be selectively stored in the plot data buffer register 126. The count is such that all the bits making up the X- , Y- and Z-characters of a single instruction are successively stored in the register 126.

The address of a desired group of instructions on the tape is set up by appropriate address switches, represented by the block 130. The particular address is compared with the addresses successively appearing in the register 122 in an address comparator circuit of any known type, as represented by the block 132. When the desired address is reached, the comparator 132 actuates a tape mode register 134 which, in turn, causes a tape control circuit 136 to stop the tape. The operator then depresses the "plot" button, and the instructions contained in the particular group of instructions identified by the selected address are then successively read into the incremental plotting system. A plurality of manually controlled tape mode switches, represented by the block 138, are also provided to control the mode of operation of the tape.

As shown in FIG. 3, the incremental plotting system is divided into two parts. The components described above provide the magnetic tape interface; and the components to be described hereinafter make up the delta generator which actually generates the incremental signals for driving the cathode ray tube 11 through an appropriate step function generator block 10. The step function generator block includes known types of step function generators which respond to successive incremental pulses from the delta generator to provide a step function for deflecting the cathode-ray beam in the cathode-ray tube 11 in the X-direction and in the Y-direction. The delta generator is also connected directly to the cathode-ray tube selectively to blank the cathode-ray beam therein in response to Z-axis incremental signals.

As shown in the magnetic tape interface portion of the incremental plotting system of FIG. 3, the plot data character counter 118 controls a plotting start-stop control circuit 140, which in turn controls the input timing circuit 142 of the delta generator portion of the system. When the plot data character counter reaches a predetermined count indicating that the next instruction to be processed is in the plot data buffer register 146, the control circuit 140 causes the input timing circuit 142 to generate simultaneously three pulses SHIFT 1, SHIFT 2 and SHIFT 3. These pulse are applied to the gate 145 to cause the contents of the plot data buffer register 126 to be shifted in parallel into the plot register 148. The control 140 also causes the input timing circuit 142 to apply a pulse RC to reset the clock rate selector 146, and then a pulse SC to an "and" gate 144. This causes a clock rate selector 146 to examine the plot data of the next instruction (which is now stored in an X, Y, Z plot register 148) and determine the pulse rate of the incremental plotter. As mentioned above, an important aspect of the present invention is the automatic control of the speed of operation of the cathode ray tube 11 for each instruction, so that the plotting speed, in each instance, will be tailored to the number of incremental steps required by that instruction.

This means that waste time is automatically reduced to a minimum. For example, if a particular instruction requires but a few incremental steps of the cathode-ray tube 11, this is carried out quickly and in a short interval, so that the system can proceed promptly to the next instruction. On the other hand, if an instruction required a relatively large number of incremental steps, the speed slows down to enable the beam of the cathode-ray tube 11 to be moved through the indicated number of incremental operations before the system passes on to the next instruction. The selected clock pulses from the clock rate selector block 146 are introduced to an "and" gate 150 which passes these pulses to a seven-bit N-counter 152, under the control of a control gate 154. This control is initiated by a pulse ST2, which is generated by the input timing circuit 142 after the clock rate has been selected. The ST2 pulse also causes the tape control circuit 136 to read a new tape plot data instruction while the N-counter is still counting.

At the end of a particular count, corresponding the the completion of a plot by a particular instruction, the N-counter 152 returns to zero. At that time, the N-counter generates a PE term which resets the plot register and disables the control gate 154. The timing circuit 142 now generates simultaneously the three pulses SHIFT 1, SHIFT 2 and SHIFT 3. These pulses are applied to a gate 145 to cause the contents of the plot data buffer register 126 to be shifted in parallel into the plot register 148, so that a new instruction is shifted into the plot register. The operation is then repeated insofar as the new instruction is concerned, and the operation continues until all the instructions in the addressed group of instructions have been processed, and the data represented thereby has been displayed on the screen of the cathode ray tube 11. The operation is carried out to constitute one frame of the microfilm camera 12, and the camera is synchronized with the cathode-ray tube to move onto the next frame when the next plot is displayed on the screen of the tube.

The N-counter 152 controls the delta output generator 156 at the selected clock rate for the particular instruction in the X, Y,Z plot register 148. The outputs of the generator 156 cause the beam of the cathode-ray tube 11 to be moved in incremental steps under the control of the step function generator 10, as specified by the X- and Y-characters of the instructions stored in the plot register, with the cathode-ray beam being selectively blanked as specified by the Z-character.

Figure 4:
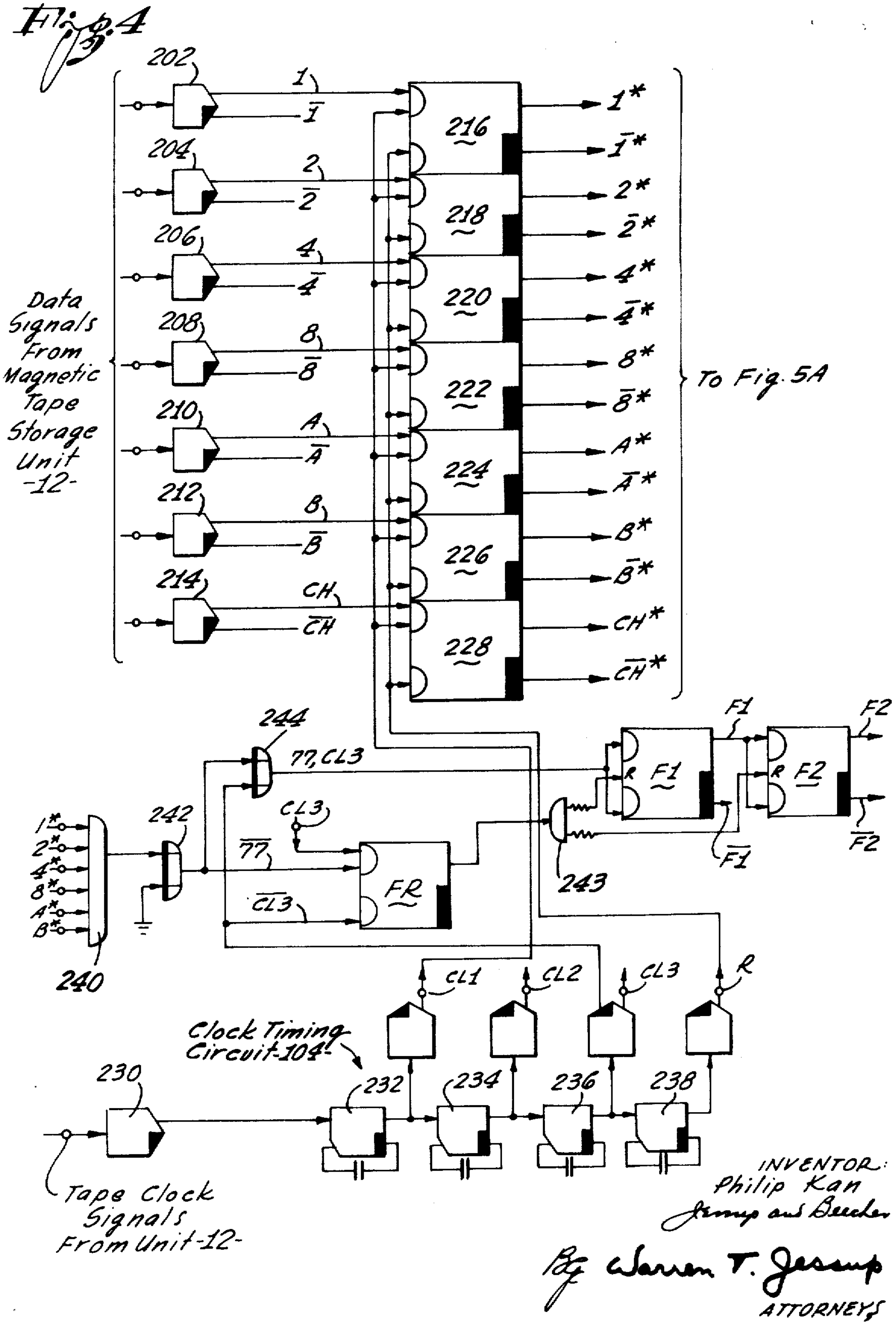
FIG. 4 is a circuit and block diagram of a clock timing circuit and register used in the system of FIG. 3.

As shown in FIG. 4, the signals sensed from the seven channels 1, 2, 4, 8, A, B, CH of the tape of FIG. 2A are respectively amplified in amplifiers 202, 204, 206, 208, 210, 212 and 214. The outputs of the amplifiers are stored in a register composed of a group of flip-flops 216, 218, 220, 222, 224, 226 and 228. The tape clock signals sensed from the tape are amplified in an amplifier 230, and the resulting amplified signal is applied to a series of one-shot multivibrators 232, 234, 236 and 238. The multivibrators form a delay chain and serve to generate a series of clock timing signals CL1, CL2, CL3 and a reset signal R, between each successive clock signal derived from the tape.

The clock signals CL1 control the timing of the flip-flop 216, 218, 220, 222, 224, 226 and 228; so that each character sensed from the tape is stored in the register formed by these flip-flops at CL1 clock time. The "set" outputs from the flip-flops 216, 218, 220, 222, 224 and 226 are all applied to an "and" gate 240 which decodes for octal 77. When octal 77 is sensed, the "and" gate 240 passes an output through an inverter 242 to a flip-flop FR. The output of the inverter 242 inhibits the flip-flop FR from being set at CL3 clock time when octal 77 is sensed. The set output terminal of the flip-flop FR is connected to the flip-flops F1 and F2 through a direct current reset gate 243. As long as the flip-flop FR is in a reset condition, the flip-flops F1 and F2 will not be reset. The "and" gate 240 also causes the term 77.CL3 to be passed through a "nor" gate 244 to the set input terminal of a flip-flop F1 and to its reset input terminal. The term CL3 is applied to the reset input terminal of the flip-flop FR.

When any input, other than octal 77 is applied to the flip-flop Fr, the flip-flop is set at CL3 clock time by the term 77. This causes both the flip-flops F1 and F2 to be reset. The flip-flop FR is then reset at the next clock time by the term CL3. When the first octal 77 is sensed, the flip-flop F1 is set at CL3 by the term 77.CL3 from the gate 244. The detection of the second octal 77 causes the flip-flop F1 to be reset. The resetting of the flip-flop F1 causes the flip-flop F2 to be set. Thus we have the condition F1 . F2 which indicates the detection of octal 77, 77.

Figure 5A:
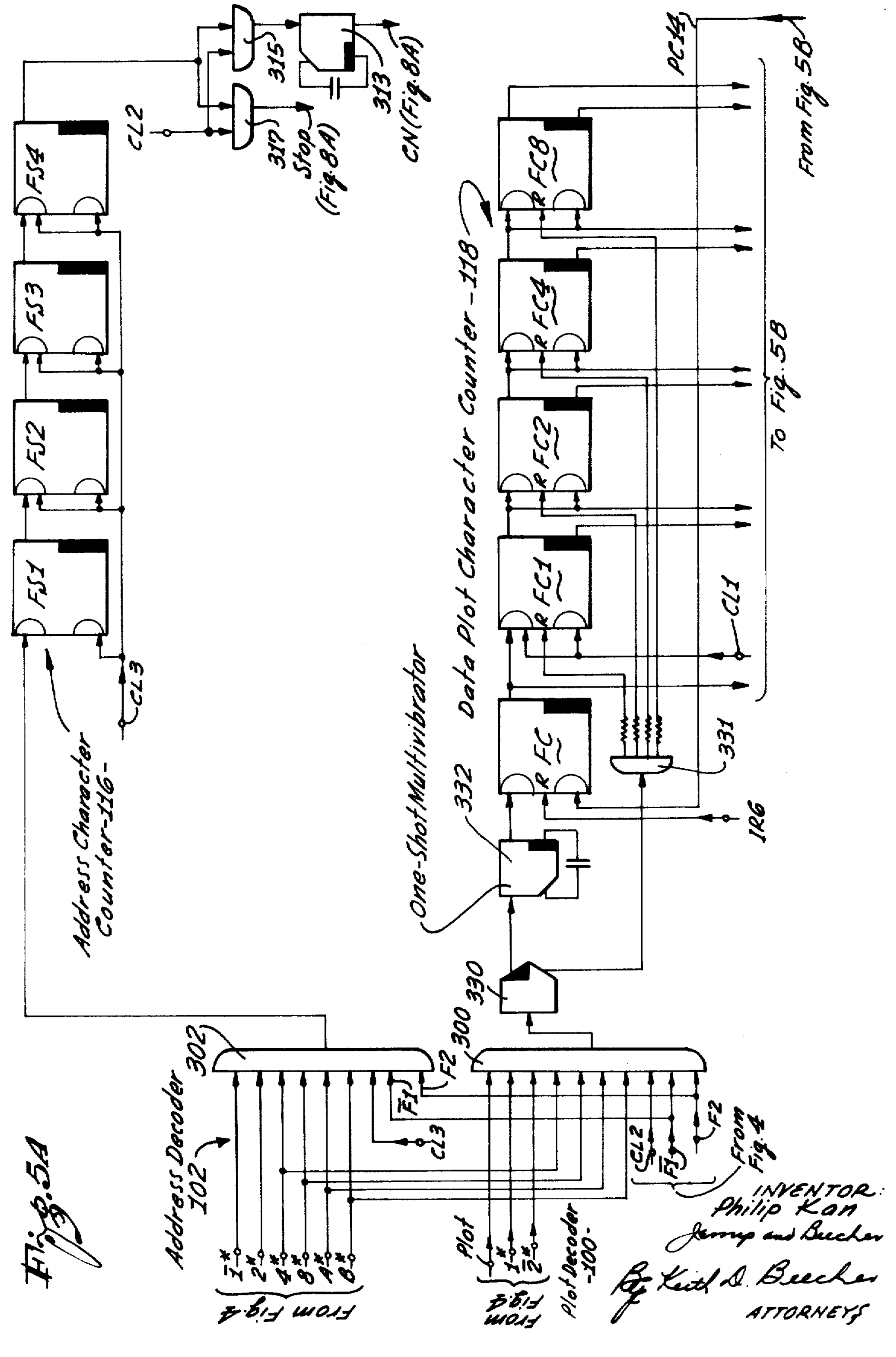
FIGS. 5A and 5B are circuit diagrams and block diagrams of address and plot data decoder logic circuitry included in the system of FIG. 3.

The "and" gates 300 and 302 (FIG. 5A) responds to the terms F1 and F2, and to the additional terms shown in FIG. 5A, so that the "and" gate 302 produces an output when 77, 77, 76 is sensed, which identifies an address; and so that the "and" gate 300 may produce an output when the octal term 77, 77, 75 is sensed, which identifies a plot instruction. However, in the case of the "and" gate 300, the system must be in the PLOT MODE before it will produce its output.

When an address octal identifier 77, 77, 76 is sensed, the "and" gate 302 passes an output to the set input terminal of a flip-flop FS1 in FIG. 5A. The flip-flop FS1, and additional flip-flops FS2, FS3 and FS4 are connected to form the address character counter 116 of FIG. 3. The address character counter is controlled by the tape clock CL3 through four steps. At the end of four steps it returns to the zero condition, and the address character counter is not stepped again until a subsequent address identifier 77, 77, 76 is detected. Each time the address character counter 116 is set to its fourth step, the "and" gates 315 and 317 are enabled, so that the next CL2 clock pulse causes a one-shot multivibrator 313 to be triggered to generate a timing pulse CN which is used, as will be described, in the control circuit of FIG. 8A. Also, the CL2 clock pulse is passed by an "and" gate 317 to produce a STOP pulse for use in the circuit of FIG. 8A, as will be described.

Likewise, when a plot instruction has been identified by the octal code 77, 77, 75, and the system is ready to process the instruction (as indicated by the plot command), the "and" gate 300 produces an output. This output is passed through an amplifier 330, delayed slightly by a one-shot multivibrator 332, or other suitable delay means, and passed to the set input terminal of a flip-flop FC. The flip-flop FC was previously reset by a manual control reset signal IR6.

The flip-flops FC1, FC2, FC4 and FC8 form the plot data character counter 118 of FIG. 3. These flip-flops are all reset first by the output from the amplifier 330 through a direct current reset gate 331. However, when the "and" gate 300 produces an output in response to an octal code 77, 77, 75, which is the plot instruction identifier, the flip-flop FC is set, and successive CL1 clock pulses step the counter. The plot data counter 118 is then counted through 14 steps as the tape of FIG. 2A moves through all the X-, Y- and Z-characters of the particular instruction, identified by the octal code 77, 77, 75 plot identifier. When the counter 118 is counted through its 14th step, the flip-flop FC is reset, so that no further counting can occur until the next 77, 77, 75 identifier is detected.

Figure 5B:
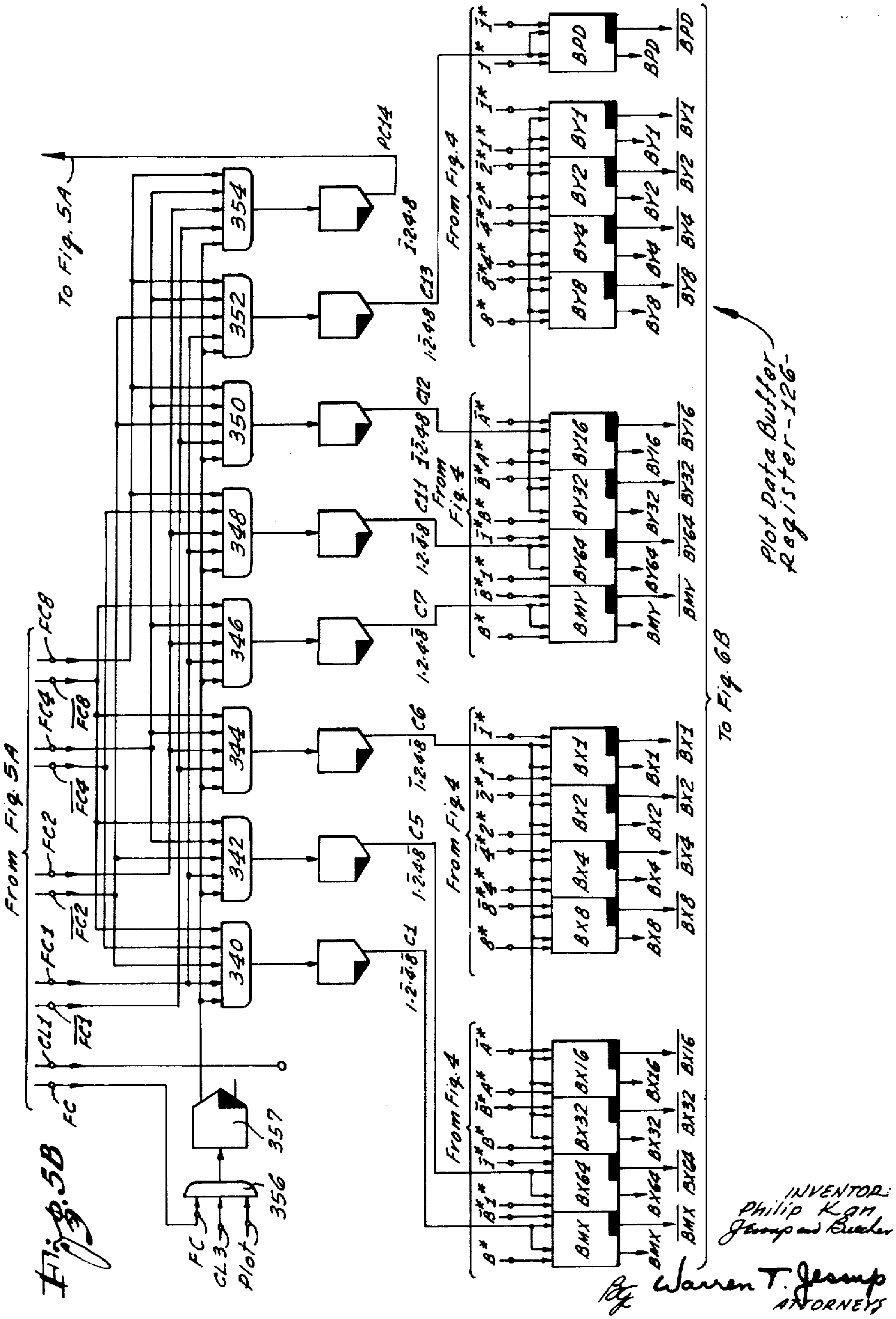

As the plot data counts through its 14 steps, appropriate outputs appear from the "and" gates 340, 342, 344, 346, 348, 350, 352 and 354 of FIG. 5B, as timed by the clock pulses CL3 applied thereto when the system is in the PLOT mode through an "and" gate 356 and amplifier 357. The counting of the character counter 118 first permits the X-sign bit to be stored in a flip-flop BMX of FIG. 5B; the most significant X-bit (X64) to be stored in a flip-flop BX64; and the remaining X-bits to be stored in flip-flop BX32, BX16, BX8, BX4, BX2, and BX1, respectively.

The counting of the character counter 118 then permits the Y-sign bit to be stored in a flip-flop BMY; the most significant Y-bit (Y64) to be stored in flip-flop BY64; and the remaining Y-bits to be stored in flip-flops BY32, BY16, BY8, BY4, BY2 and BY1 respectively. Finally, the counting of the character counter 118 permits the Z-bit, which turns the cathode-ray beam in the cathode-ray tube 11 on or off, to be stored in a flip-flop BPD. The flip-flop BMX, BX64, BX32, BX16, BX8, BX4, BX2, BX1, BMY, BY64, BY32, BY16, BY8, BY4, BY2, BY1 and BPD form the plot data buffer register 126 of FIG. 3.

To recapitulate the system thus far described, it is understood then that the tape of FIG. 2A is first searched until a desired address is reached. Each address is identified by the octal code 77, 77, 76 and as each address is sensed, it may be displayed by an appropriate display, as designated by the block 128 of FIG. 3. When the desired address is reached, the tape transport will stop automatically. Then, when the PLOt button is depressed, the incremental plotting system will enter its plot mode, and it will successively sense the X-, Y- and Z-characters of the group accompanying the desired address. Each of the individual characters is identified by a 77, 77, 75 identifier, so as to assure synchronism between the incremental plotting system and the tape. When the first, X-, Y- and Z-characters are sensed, they are stored in the plot data buffer register 126 of FIG. 3, which is made up of the flip-flops BMX, BX64, BX32, BX16, BX8, BX4, BX2, BX1, BMY, BY64, BY32, BY16, BY8, BY4, BY2, BY1 and BPD of FIG. 5B. Between each of the X-, Y- and Z-characters, the tape stops until the system has indicated a readiness for the next characters of the group.

Figure 6A:
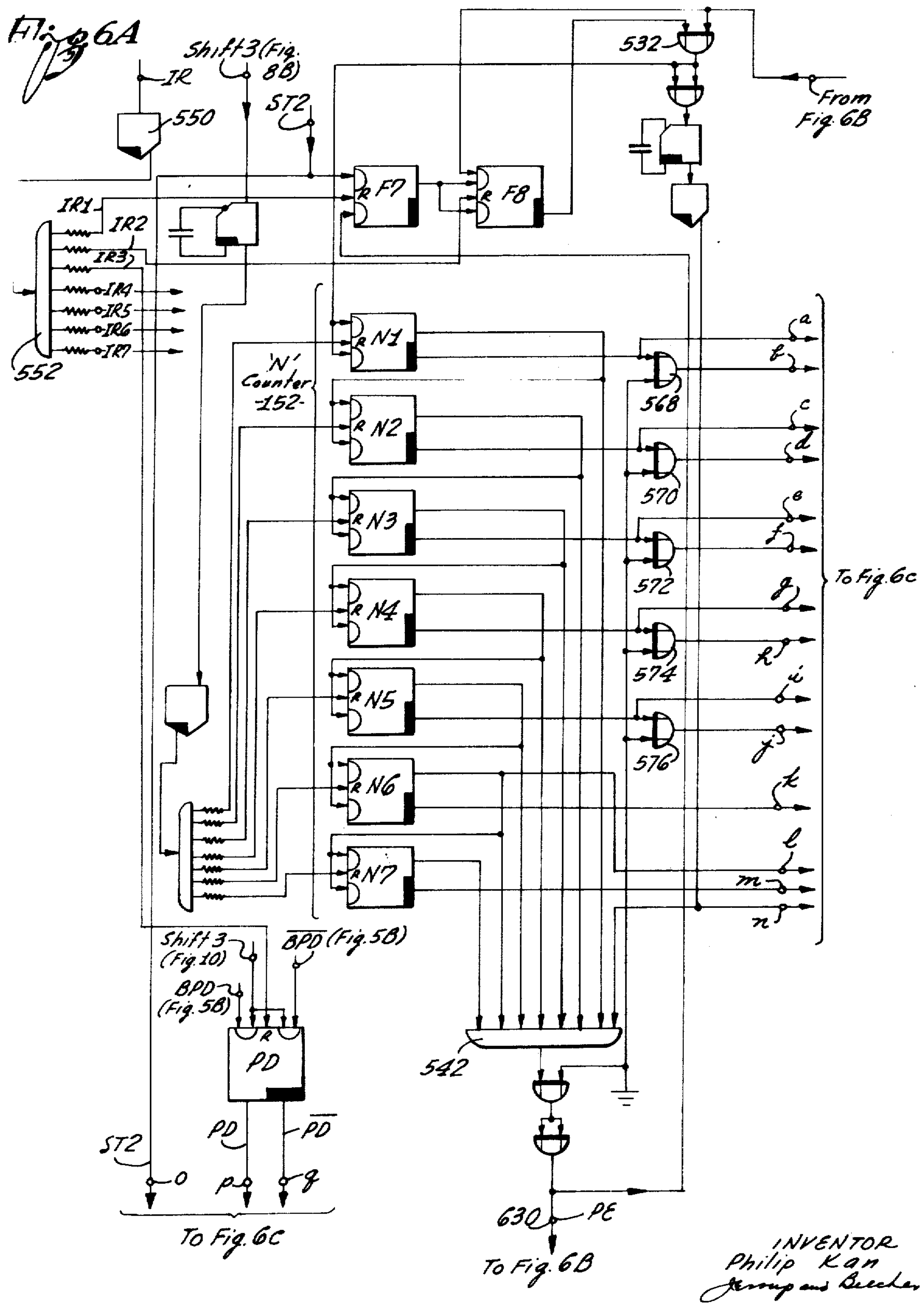
FIGS. 6A-6D are logic circuit diagrams and logic block diagrams of a delta generator which is included in the system of FIG. 3.
Figure 6B:
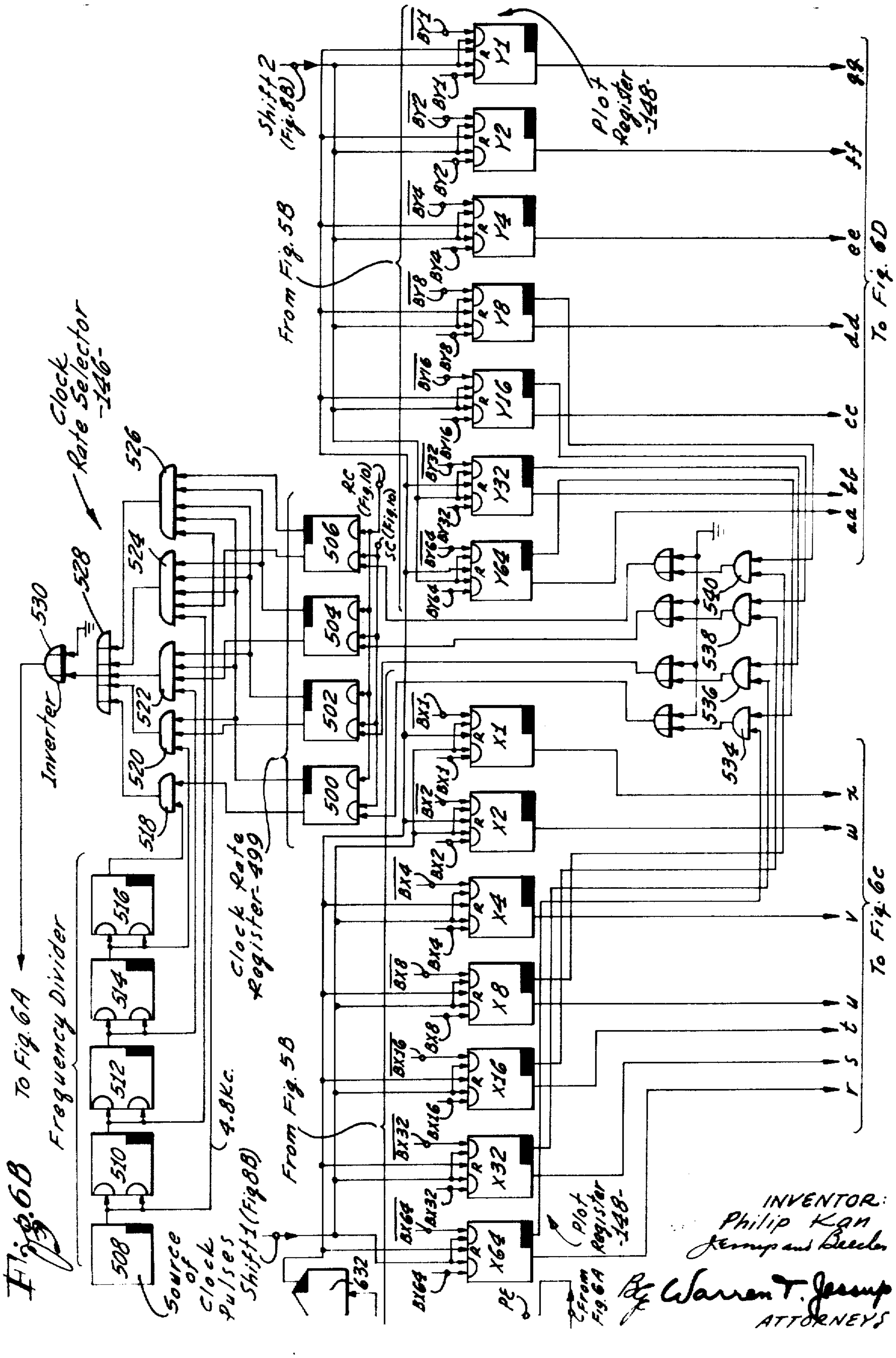
Figure 6C:
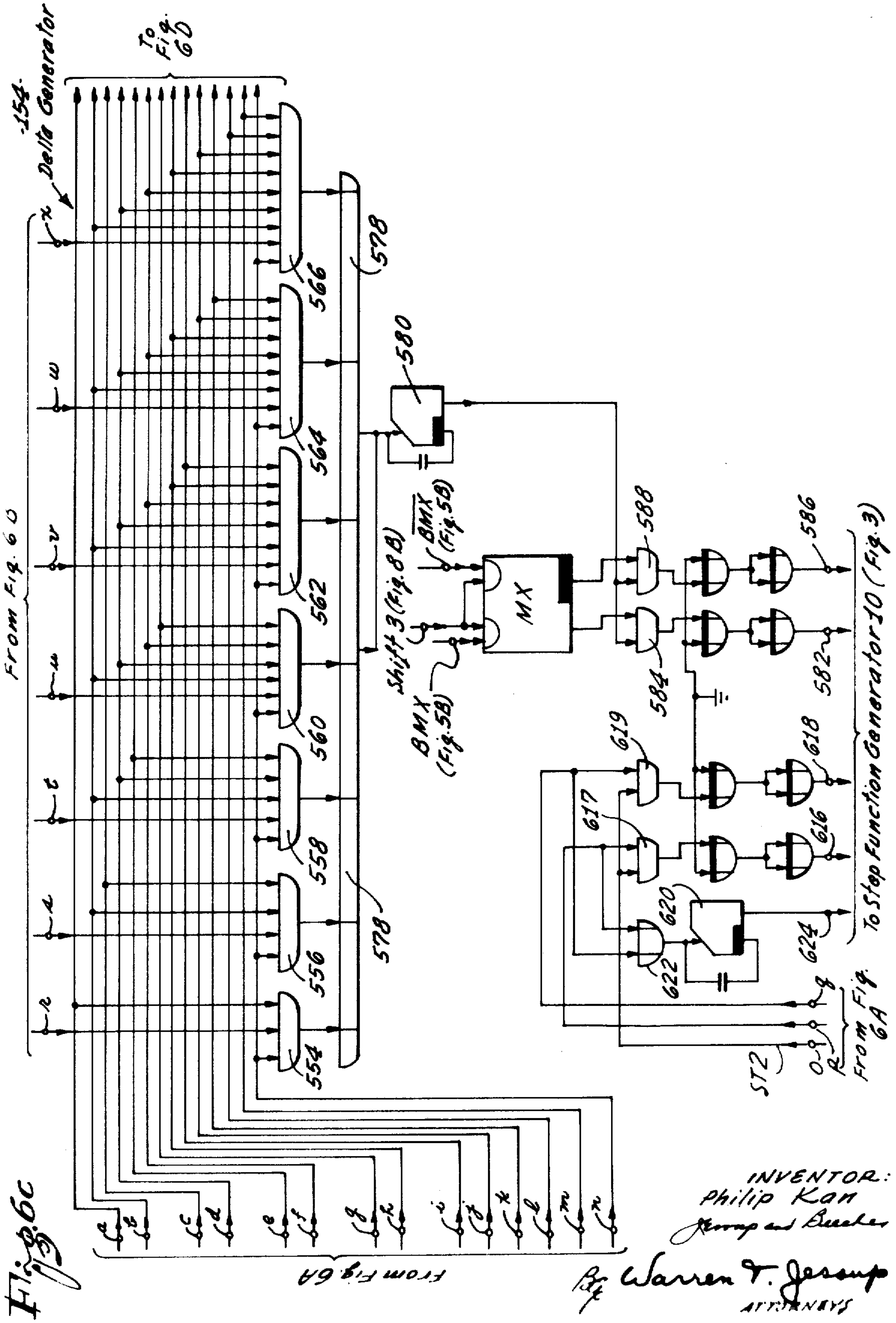

The various components 146, 148, 152, 156 and 154 of the delta generator of FIG. 3 are shown in detail in FIGS. 6A, 6B and 6C. The contents of the plot data buffer register 126 of FIGS. 3 and 5B are transferred in parallel into the X- , Y- and Z-plot register, upon the receipt of the various shift commands, as will be described. For example, a "SHIFT 1" command causes the X-instruction bits to be shifted together out of the flip-flops BX64, BX32, BX16, BX8, BX4, BX2 and BX1 of the plot data buffer register 126 of FIGS. 3 and 5B into the flip-flops X64, X32, X16, X8, X4, X2 and X1 of the plot register 148 of FIG. 6B. Likewise, a "SHIFT 2" command causes the Y-instruction bits to be shifted together out of the flip-flops BY64, BY32, BY16, BY8, BY4, BY2 and BY1 of the plot data buffer register 126 of FIG. 5B, into the flip-flops Y64, Y32, Y16, Y8, Y4, Y2 and Y1 of the plot register 148 of FIG. 6B.

In the same way, a "SHIFT 3" command causes the Z-instruction to be passed from the BPD flip-flop of the plot data buffer register 126 of FIG. 5B to a PD flip-flop in FIG. 6A. It will be appreciated that when the flip-flop is set, the cathode-ray beam in the cathode-ray tube 11 of FIG. 3 is active, so that the incremental movements of the beam by the associated X- and Y-commands produce traces on the screen of the cathode-ray tube. However, when the flip-flop PD is reset, the beam is extinguished, and no trace appears on the screen in response to the corresponding X- and Y-commands. Likewise, the "SHIFT 3" command causes the X-sign bit to be shifted from the buffer flip-flop BMX of FIG. 5 into a flip-flop MX in FIG. 6C; and it causes the Y-sign bit to be shifted from the buffer flip-flop BMY of FIG. 5 into the flip-flop MY of FIG. 6D. A clock rate register 499 is also included in the circuit of FIG. 6B, which is made up of four flip-flops number 500, 502, 504 and 506.

As mentioned above, a feature of the system described herein is its ability to control the speed of movement of the cathode-ray beam in correspondence with the number of incremental steps it is to be moved in the X- or Y-direction in response to any particular command. This control is provided by means of five different beam control clock rates and by selecting a particular rate in accordance with the number introduced into the clock rate register 499.

A source 508 of clock pulses is provided, and this source generates clock pulses having a repetition frequency, for example, of 4.8 kilocycles. A series of frequency dividers 510, 512, 514 and 516 are coupled to the source 508, and these produce clock pulses, for example, at repetition frequencies of 2.4 kilocycles, 1.2 kilocycles, 600 cycles and 300 cycles respectively. The clock source 508, and the frequency dividers 510, 512, 514 and 516 are respectively coupled to "and" gates 518, 520, 522, 524 and 526. These "and" gates are controlled by the register made up of the flip-flops 500, 502, 504 and 506, so that a particular clock rate is passed through the "nor" gate 528 and inverter 530 to the gate 532 of FIG. 6A.

The clock rate to be selected depends upon the highest number stored in the X- and Y-portions of the plot register 148 in FIG. 6B. At the outset the clock rate register 499 is reset by the introduction of a term RC to the reset input terminals of each of the flip-flops 500, 502, 504 and 506 of the clock rate register. This enables the gate 526 so that the highest clock rate is applied to the gate 532.

The term SC is then applied to the flip-flops 500, 502, 504 and 506 of the clock rate register 499 so as to enable the flip-flops to be set in accordance with the higher number stored in the X- or Y-portion of the plot register 148. This latter setting is achieved through "and" gates 534, 536, 538 and 540 which are respectively connected to the flip-flops X64, X32, X16, X8, and Y64, Y32, Y16 and Y8. In this way, if the larger number of the two stored in either the X-portion or the Y-portion of the plot register 148 is between 32 and 63, a 600 cycle clock rate is selected and applied to the gate 532; if the number is between 16 and 31, the 1.2 kilocycle clock rate is selected and applied to the gate 532, and so on. Only after the desired clock rate has been selected, is the term ST2 derived, as will be explained, and applied to the flip-flop F7 in FIG. 6A to set that flip-flop. The flip-flop F8 is then set by the setting of the flip-flop F7, enabling the gate 532, so that the selected clock rate may be applied to a flip-flop N1. The flip-flops N1–N7 are arranged as a binary counter to constitute the "N" counter 152 of FIG. 3. When the selected clock signal is applied to the flip-flop N1, the "N" counter counts through 127 steps at the rate of the applied clock signal. At the 127th step of the N-counter the "and" gate 542 passes a pulse PE which resets the flip-flop F7, thereby disabling the gate 532 and preventing any further actuation of the N-counter.

A signal IR is derived from any suitable relay circuit, not shown, coupled to the "on" switch of the system. This signal is generated whenever the system is turned on, and it serves initially to reset the various components of the system to a predetermined state. This signal is applied to an amplifier 550 in FIG. 6A, and is applied to a direct current reset gate 552. The gate 552 generates a series of reset signals IR1–IR7 in response to the IR signal. The reset signals IR1, IR2 and IR3 are applied to the flip-flops F7, F8 and PD, respectively.

When the N-counter 152 of FIG. 3 and FIG. 6A has been counted through its entire 127 steps, thereby completing the execution of the character in the X- and Y-sections of the plot register 148, of FIGS. 3 and 6B, the gate 542 of FIG. 6A passes the pulse PE, as mentioned above, and this pulse is amplified in an amplifier 632 in FIG. 6B, and it serves to reset the flip-flops X1, X2, X4, X8, X16, X32, X64, Y1, Y2, Y4, Y8, Y16, Y32 and Y64 of the plot register 148. This causes the plot register 148 to be conditioned to receive the next X- and Y-characters from the plot data buffer register 126 of FIG. 5B when the SHIFT 1 and SHIFT 2 signals are again produced.

As explained above, the SC signal from the circuit of FIG. 8B sets the clock rate selector register 499 in FIG. 6B in accordance with the higher number in the X- and Y-portions of the plot register 148. At the completion of the execution of the particular character, the register is reset by the term RC, which also is derived from the circuit of FIG. 8B.

The flip-flops X64, X32, X16, X8, X4, X2, X1 of the X-portion of the plot register 148 in FIG. 6B are connected to corresponding gates 554, 556, 558, 560, 562,

564, 566 in FIG. 6C. Various outputs of the N counter 152 of FIG. 6A are also applied, as shown, to the gates. Inverter amplifiers 568, 570, 572, 574, 576 are included in the leads, as shown, so as to provide a desired logic relationship in the keying of the gates. The gates are connected through an "or" gate 578 to a one-shot multivibrator 580 in FIG. 6C. The output of the one-shot multivibrator is passed through a gate 584, and is applied to the step function generator 10 of FIG. 3 by way of a terminal 582 for one condition of the X-sign flip-flop MX, and through a gate 588 and by way of an output terminal 586 for the other condition of the X-sign flip-flop MX. The step function generator responds to signals from the output terminals 582 or 588 to step either in a positive sense or as to deflect the cathode-ray beam in one direction from a reference point, or in a negative sense to deflect the cathode-ray beam in the other sense, depending upon the state of the X-sign flip-flop MX.

Figure 6D:
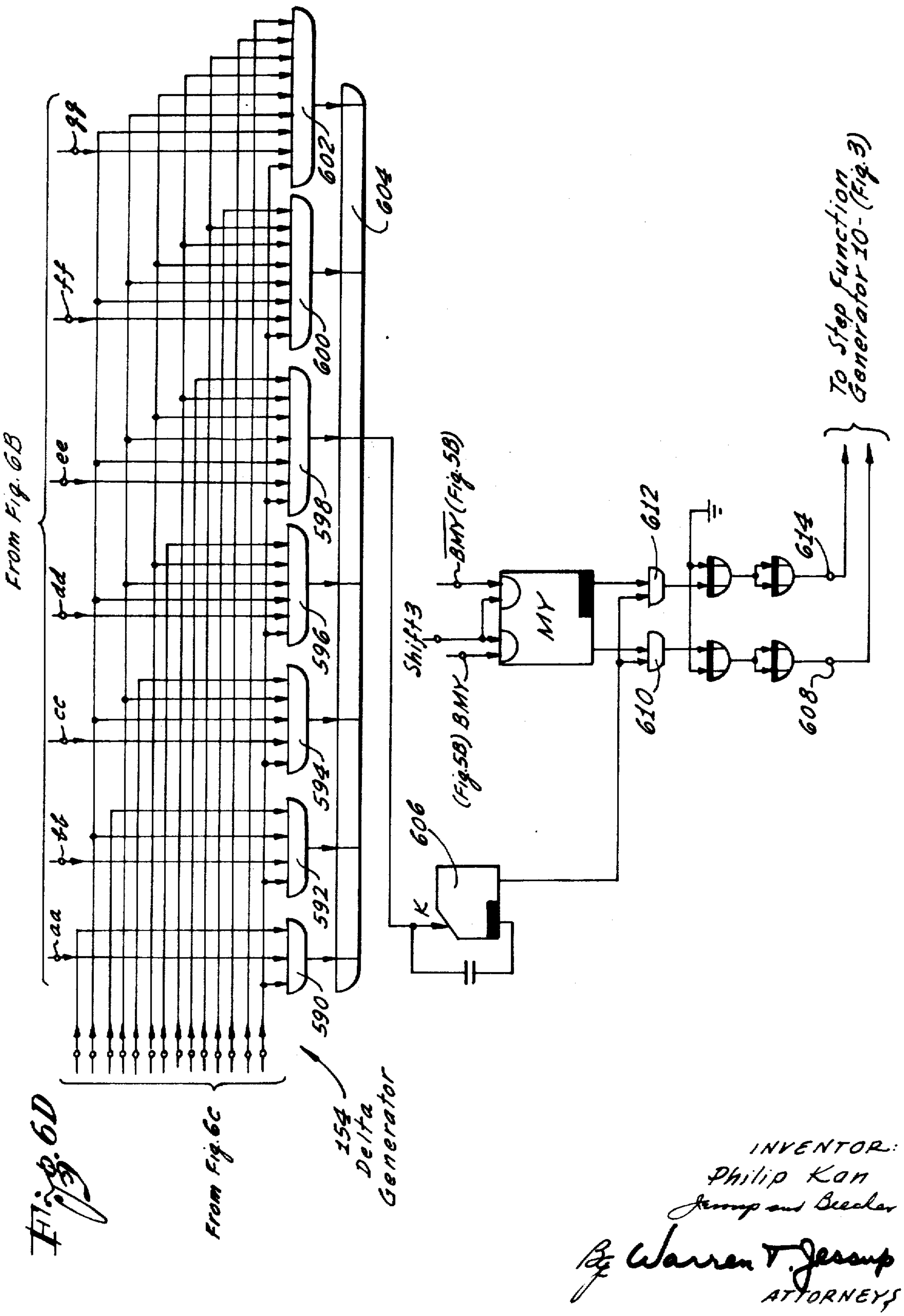

Likewise, the flip-flops Y64, Y32, Y16, Y8, Y4, Y2, Y1 of the Y-portion of the plot register 148 of FIG. 6B are connected to corresponding gates 590, 592 594, 596, 598, 600, 602 in FIG. 6D. The outputs from the N-counter 152 of FIG. 6A are also applied to the gates by way of a portion of the circuit illustrated in FIG. 6C. The gates are connected through an "or" gate 604 to a one-shot multivibrator 606. The output of the one-shot multivibrator 606 is applied to the step function generator 10 of FIG. 3 through a gate 610 and by way of an output terminal 608 when the Y-sign flip-flop MY is in one state, and through a gate 612 and by way of terminals 614 when the Y-sign flip-flop MY is in the other state. In this way, the step function generator generates deflection signals along the Y-axis for the cathode-ray beam in a first direction from reference when the Y-sign flip-flop MY is in one state, and in the other direction from the reference point when the Y-sign flip-flop MY is in its other state.

Figure 8A:
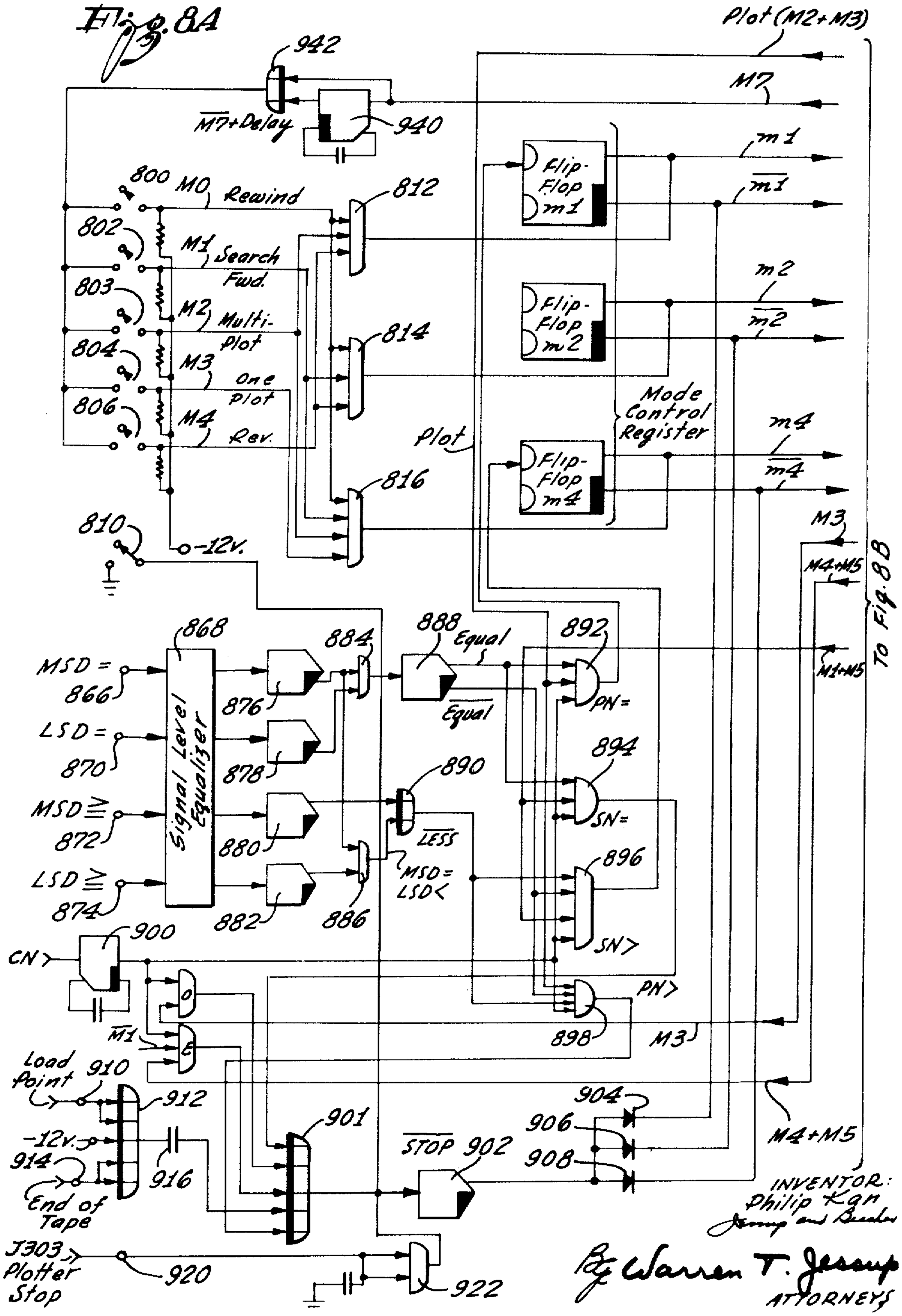
FIGS. 8A and 8B are logic circuit diagrams and logic block diagrams of certain control circuits used in the system of FIG. 3, to control the magnetic tape storage unit therein.
Figure 8B:
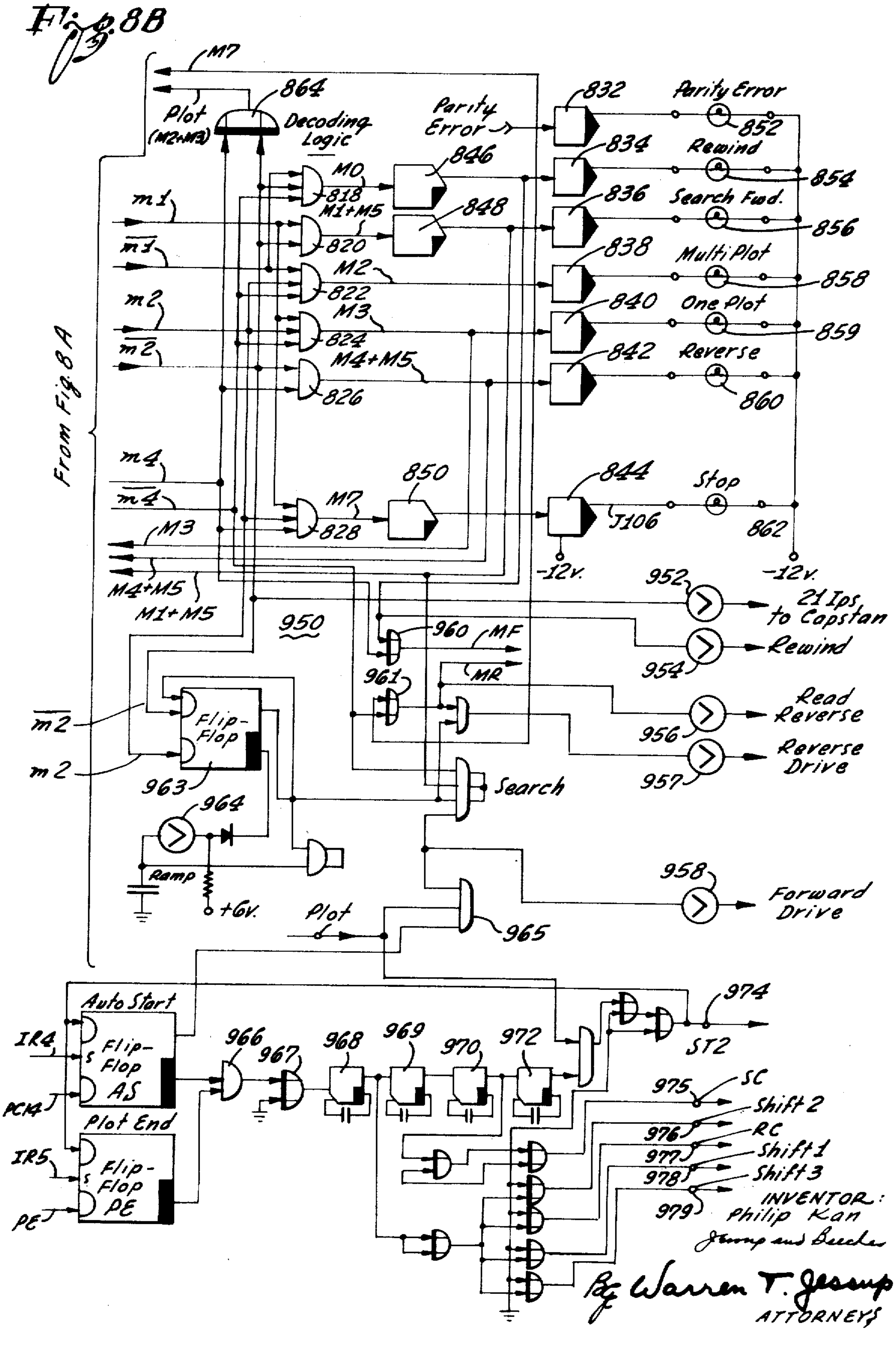

It will be understood that the X-character is introduced in parallel from the data buffer register 126 of FIG. 5B into the X-portion of the plot register 148 of FIG. 6B in response to the SHIFT 1 term from the circuit of FIG. 8B; the Y-character is introduced in parallel from the data buffer register 126 of FIG. 5B into the Y-portion of the plot register 148 of FIG. 6B in response to the SHIFT 2 term from the circuit of FIG. 8B; and the X- and Y-sign bits are respectively shifted into the MX and MY sign flip-flops of FIGS. 6C and 6D in response to the SHIFT 3 term from the circuit of FIG. 8B. As will be described, all three SHIFT terms are generated simultaneously.

The SHIFT 3 term derived from the circuit of FIG. 8B also serves to shift the Z-character into the PD flip-flop f FIG. 6A. When the cathode-ray beam is to be illuminated, an output is produced at the terminal 616 of FIG. 6C through a gate 617; and when the cathode-ray beam is to be extinguished, an output is produced at a terminal 618 of FIG. 6C, through a gate 619. This occurs, however, only when the ST2 (start plot) signal is produced, so as to enable the gates 617 and 619. It has been found preferable, for practical reasons, that when there is to be a change in the beam extinguished or beam illuminated condition of the cathode-ray tube 11, the Z-character should be programmed to exist alone in the entire instruction, so that there will be no simultaneous X- or Y-movements of the cathode-ray beam as it is being extinguished or illuminated.

Figure 7:
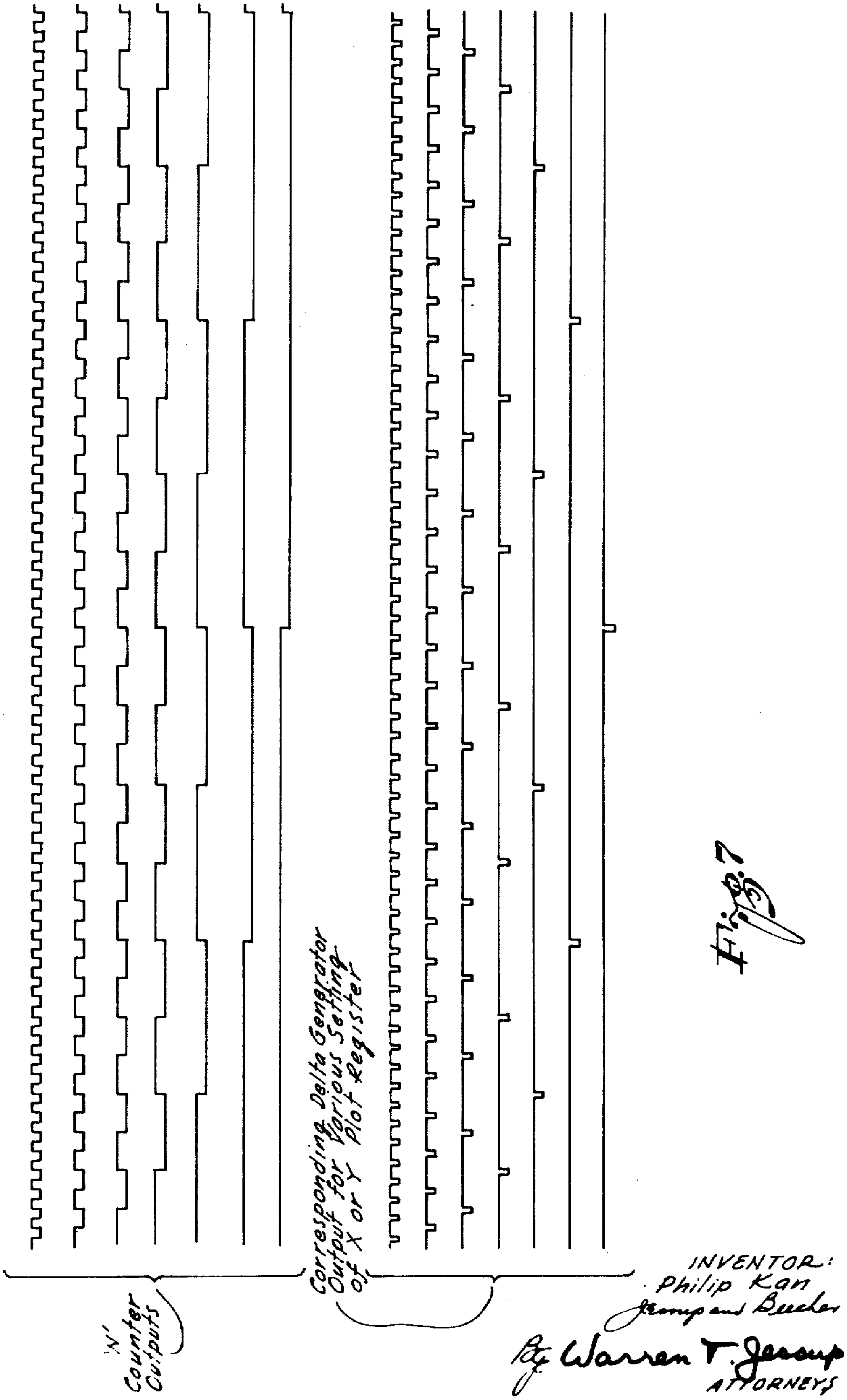
FIG. 7 is a timing diagram useful in explaining the operation of the delta generator of FIGS. 6A–6D.

After the new instruction has been shifted into the X- and Y-plot register 148 of FIG. 6B and into the MX and MY flip-flops of FIGS. 6C and 6D, as described above, in response to the SHIFT signals, the clock rate register 499 of FIG. 6B is set by the term SC, and the desired clock rate is selected, as determined by the greater of the X- and Y-numbers in the plot register. The start plot pulse (ST2) is then applied to the system by way of the terminal of FIG. 6A to enable the gates 617 and 619 in FIG. 6C and cause the control flip-flops F7 and F8 in FIG. 6A to enable the gate 532. The enabling of the gate 532 causes the N-counter 152 of FIG. 6A to be actuated at the selected clock speed. The N-counter is then counted through its 127 steps at the selected clock rate, and the various flip-flops which make up the N-counter produce the waveforms shown in the upper part of the curves of FIG. 7. These waveforms, and their complements, control the gates 554, 556, 558, 560, 562, 564 and 566 in FIG. 6C, and the gates 590, 592, 594, 596, 598, 600 and 602 in FIG. 6D; so that predetermined number of pulses are simultaneously passed to the output terminals 582 and 586 in FIG. 6C, and to the output terminal 608 and 614 in FIG. 6D, depending upon the setting of the flip-flops in the X- and Y-portions of the plot register. The pulses are passed to the step function generator 10 of FIG. 3 and cause it to generate a first stepped signal which is applied to the electrodes of the cathode ray tube 10 to control the deflection of the cathode-ray beam in the X-direction, this first stepped signal increasing in a positive or negative direction, depending upon the setting of the X-sign flip-flop MX of FIG. 6C. Simultaneously, pulses are passed to the step function generator 10 to cause it to generate a second stepped signal which is applied to the electrodes of the cathode ray tube which control the Y-deflection of the cathode-ray beam, and this latter signal increases in the negative or positive direction, depending upon the setting of the Y-sign flip-flop MY in FIG. 6D.

As will be described, the ST2 pulse (FIG. 8B) also sets an AUTO START flip-flop and a PLOT END flip-flop. The setting of the AUTO START flip-flop will start the sensing of the tape again, so that the next instruction can be read into the plot data buffer register 126 of FIG. 5B, while the incremental pulses corresponding to the previous instruction are being fed to the step function generator 10. As shown in the lower part of the curves of FIG. 7, for example, if the X1 (or Y1) flip-flop alone is set, a single pulse is passed to the output, designating an X- or Y-character of "1." However, if the X-character, for example, is "65," the X64 flip-flop will also be set and 65 incremental pulses will be passed to the X-stepping generator of the step function generator 10. In this way, any desired number of incremental pulses may be applied to the step function generator, from 0–127, depending upon the contents of the plot register. Therefore, the cathode-ray beam of the cathode-ray tube 11 is moved a predetermined number of incremental steps, depending upon the Y-character in the plot register 148 of FIG. 6B, and it is also moved a predetermined number of incremental steps, depending upon the X-character in the plot register.

Therefore, the incremental plotting system of the invention can deflect the cathode-ray beam of the cathode-ray tube 11 in such a way that lines of any slope, for example, may be traced across the screen of the cathode-ray tube, depending upon the characters received by the incremental slotting system from the magnetic tape. Also, the plot can be interrupted at appropriate intervals, depending upon the Z-characters. Also, an appropriate clock rate is automatically selected, as described above, so that the deflection speed for the cathode-ray tube is maximized to the highest practical level for each character.

After the execution of each plot instruction, the N-counter 152 of FIG. 6A completes its count and produces the PLOT END signal PE at the output terminal 630, as noted above. This signifies that the cathode-ray tube 11 is ready to receive the next character. The term PE resets the PLOT END flip-flop of FIG. 8B, and causes the signals RC, SHIFT, SC and ST2 to be produced. The PE signal is also amplified by an amplifier 632 and applied to the flip-flops of the plot register 148 of FIG. 6B to reset the flip-flops and condition the plot register to receive the next instruction. The signal RC is applied to the clock rate selector register 499 of FIG. 6B to return that register to its zero condition.

The circuit of FIGS. 8A and 8B is used to control the tape storage unit 8, and other parts of the incremental delta plotting system, as will be described. These controls originate, for example, at a series of manually operated push button switches designated 800, 802, 803, 804, 806 and 810 in FIG. 8A. The switch 800, for example, causes the tape storage unit to rewind, when the switch 800 is closed and released. The switch 802 causes the magnetic tape storage unit to search in the forward direction, the switch 810 is the stop switch for the system. The switch 803 places the system in the multi-plot mode, whereas the switch 804 places the system in the single plot mode. The switch 806 places the system in the reverse mode. The switches 800, 802, 803, 804 and 806 may be push button switches. The switches are connected to a group of "and" gates 812, 814 and 816 to a series of flip-flops *m*1, *m*2 and *m*4. The flip-flops *m*1, *m*2 and *m*4 form a mode control register, and they are established in a different pattern of settings, depending upon which of the push button switches is closed.

The outputs from the flip-flops *m*1, *m*2 and *m*4 are applied to a series of "and" gates 818, 820, 822, 824, 826 and 828 in FIG. 8B. These "and" gates are connected to constitute decoding logic circuitry, and a predetermined signal level is developed on the corresponding output leads of the decoding logic circuitry, depending upon the mode of operation in which the system is placed by the aforesaid switches. The decoding logic circuitry also develops the PLOT signal ($m2 + m3$) through a "nor" gate 864.

The various modes of operation are established in accordance with the following table:

| | Modes of Operation | Speed-Inches per Second |
|---|---|---|
| M0 | Rewind | 168 |
| M1 | Search forward | 21.6 |
| M2 | Multi-plot | 2.16 |
| M3 | One plot | 2.16 |
| M4 | Reverse | 21.6 |
| M5 | Search Reverse | 21.6 |
| M7 | Stop | |

The various outputs from the decoding logic circuitry, together with the parity error signal derived from the flip-flop 114 in FIG. 3 are applied to a corresponding series of lamp driver circuits designated respectively 832, 834, 836, 838, 840, 842 and 844. Additional amplifiers 846, 848 and 850 are interposed before the respective drivers 834, 836 and 844. As shown, the lamp drivers are connected to respective indicating lamps 852, 854, 856, 858, 859, 860 and 862 which indicate respectively "parity error," and the following system modes "rewind," "search forward," "multi-plot," "one plot," "reverse," and "stop."

Whenever equality is achieved in the address comparator 132 of FIG. 3 between the address established by the switches of the block 130, and the address is successively sensed on the magnetic tape by the system, a predetermined signal level is established on the lead 866 in FIG. 8A, which is connected to a signal level equalizer circuit 868. Likewise, when equality between the least significant digits of the current address and the desired address is detected by the comparator, a predetermined signal level is applied to the circuit 868 by way of the lead 870. On the other hand, when the indication is that the most significant digit of the current address is greater than that of the desired address, a predetermined signal level is established on the lead 872 in FIG. 8A. Likewise, when the least significant digit of the current address is greater than the least significant digit of the desired address, a predetermined signal level is established on the lead 874 in FIG. 8A.

The circuit 868 applies the various signals received by it to a series of amplifiers 876, 878, 880 and 882 in FIG. 8A. These amplifiers, in turn, are connected to a pair of "and" gates 884, 886. The "and" gate 884 is connected to an amplifier 888 which develops a predetermined signal level at one of its output terminals when full equality exists between the current address and the desired address, and establishes a predetermined signal level at its complement output terminal when no such equality exists.

The amplifier 800 and "and" gate 886 are also connected to a "nor" gate 890, and the "nor" gate develops a predetermined signal level at its output when the current address is greater than the desired address. The outputs from the amplifier 888 and "nor" gate 890 are applied to a set of "and" gates 892, 894, 896, 898. These "and" gates are timed by a pulse derived from a one-shot multivibrator 900 which, in turn, is triggered by a pulse CN. The pulse CN is derived from the address character counter F4 in FIG. 5A, and is timed to occur after the corresponding digit of the current address is actually in the address register 122 of FIG. 3.

It will be observed that the plot term (M2 + M3) is applied to the "and" gates 892 and 898, so that these "and" gates are enabled only during the plot mode. The "and" gate 894 develops an output during the search mode when equality is reached between the current address and the desired address. The output from the "and" gate 894 is applied through a "nor" gate 901 and an amplifier 902, and through isolating diodes 904, 906, 908 to the various flip-flops *m*1, *m*2, *m*4, so as to set the system to the stop mode (M7).

Therefore, when equality is detected in the comparator 132 of FIG. 3 between the current address and the desired address during the search mode, the system is stopped. It will be remembered, that the system is then put into operation, by the operator pressing the plot button, so as to establish the plot mode. That is, he would close either switch 803 for multi-plot or close switch 804 for one plot. It will also be remembered that during the search mode, the system initially moves to the first address which is compared with the desired address. Then, if the current address is greater than the desired address, the tape reverses, and scans to the desired address in the opposite direction which, by reason of the comparison, is known to be the shortest distance to the desired address.

This latter control is initiated by an output generated by the "and" gate 896. The "and" gate 896 generates that output when the first address to be compared is found to be greater than the desired address, and the output sets the flip-flop m4. The system then searches in the reverse direction (M5) until address equality is reached, at which time the "and" gate 894 develops an output, which stops the system, as described above.

As mentioned above, the "and" gate 892 develops an output when the system is in the plot mode, and when address equality is reached. This output changes the system to the "one plot" mode, by setting the flip-flop M1. That is, if the system had been set to the multi-plot mode, it would continue to plot through one group of instructions to the next, until a particular address was reached. At that time, address equality would be achieved, so that the "and" gate 892 would develop an output which, in turn, would set the system to the one plot mode, so that the system would automatically stop plotting at the end of the following group of instructions.

The "and" gate 898 is included to provide an automatic stop whenever, during the plot mode, the current tape address is greater than the desired switch address.

The tape used in the magnetic tape storage unit 12 of FIG. 1 is usually equipped with a detector which senses the beginning and end of the tape. When the beginning of the tape is sensed, a predetermined signal level is established on the lead 910 connected to a "nor" gate 912, and when the end of tape is detected, a predetermined voltage level is established on a lead 914 connected to the "nor" gate. The "nor" gate 912 is coupled through a capacitor 916 to the "nor" gate 901.

The connections are such that when the system is first started, it will move automatically to the load point of the tape and then stop. Further action must then be taken to place the system in operation, such as depressing one of the push button switches described above. Then, the system will proceed to operate until the end of the tape is reached, at which time it will automatically stop. The plotter itself is also capable of stopping the system, by developing a predetermined voltage level on a lead 920, the latter lead being coupled through an "and" gate 922 to the input of the amplifier 902.

The stop signal M7 is also applied to a one-shot multivibrator 940 in FIG. 8A and is applied together with the output from the one-shot multivibrator through a "-nor" gate 942, to the terminals of the switches 800, 802, 803, 804 and 806. The circuit is such that the system cannot be set to any of its modes unless it is first in its stop mode. The one-shot multivibrator provides a delay, so that when any one of the switches is operated, a "race" condition does not arise and the flip-flops *m*1–*m*4 will, in each instance, be properly set or reset.

The various mode control register flip-flops m1, *m*2 and *m*4 are also connected through logic control circuitry designated generally as 950 to a series of emitter followers 952, 954, 956, 957 and 958. The emitter followers apply appropriate control signals to the tape transport of the magnetic tape unit 12 of FIGS. 1 and 3. For example, the emitter follower 952, under the corresponding mode control conditions (*m*2), passes a control voltage to the magnetic tape storage unit 12, so that it will move forward at the desired tape speed of 21.6 inches per second for search purposes.

Likewise, the emitter follower 954 applies a control voltage to the tape transport 12 during the M0 mode, so that the tape transport will perform a rewind operation. The emitter follower 957 responds during the M4 reverse mode to drive the tape transport in the reverse direction. The emitter follower 958 responds during the search or the plot modes to drive the tape forward.

When the tape transport is moving in the forward direction, a "nor" gate 960 in the circuitry 950 of FIG. 8B develops a signal level MF which, as described, is utilized in the circuit of FIG. 5A to control certain logic gates. Likewise, a "nor" gate 961 in the logic circuitry 950 develops a voltage level MR when the tape transport is moving in the reverse direction which, likewise, is utilized by the circuitry of FIG. 5A.

A flip-flop 963 is included in the circuitry 950, and this flip-flop in conjunction with a ramp generating circuit 964 provides an automatic delay of, for example, 5 seconds. This delay is effective when the mode is changed from, for example, M7 to M1 or M7 to M4, and provides time for the tape transport to come up to a fast speed, before the sensing circuitry itself is activated.

A pair of flip-flops AS (automatic start) and PE (plot end) are also included in the circuitry of FIG. 8B. The flip-flop AS is set by the IR4 pulse derived from the reset gate 552 of FIG. 6A, and the flip-flop PE is reset by the IR5 pulse derived at the same time from that gate. When the system is first turned on, an IR pulse is derived, and this is applied to the gate 552 in FIG. 6A. The resulting IR4 and IR5 pulses set and reset the flip-flops AS and PE respectively. The setting of the flip-flop AS enables the "and" gate 965 in the control circuitry 950, so as to permit the tape transport to be set to the forward drive condition during the plot modes.

This condition continues until PC14 time, at which all the information is in the plot data buffer register 126 of FIG. 3, and is ready to be shifted over to the plot register 148. At this time, the PC14 timing pulse resets the flip-flop AS which, in turn, causes the tape transport to come to a stop. The resetting of the flip-flop AS enables the "and" gate 966 which is connected to the reset output terminal of the flip-flop. At the termination of the count of the N-counter of FIG. 6A, indicating that the information in the plot register 148 of FIG. 3 has all been used to control the incremental plotter 10, a pulse PE is generated by the circuitry of FIG. 6A, and this pulse resets the flip-flop PE.

The output of the "and" gate 966 when the flip-flop PE is reset is inverted in an inverter 967, and the resulting pulse from the inverter triggers successively a chain of one-shot multivibrators 968, 969, 970 and 972. As illustrated, the outputs of the one-shot multivibrators are passed through appropriate inverters to respective output terminals 974, 975, 976, 977, 978 and 979, so that the various shift pulses "SHIFT 1, " "SHIFT 2," "SHIFT 3" may be generated to shift the contents of the buffer register 126 into the plot data register 148. Also, the timing pulses SC and RC are also generated, these being utilized in the manner described above. The output terminal 974 generates, at the end of the cycle, the pulse ST2 which, likewise, is used in the manner described above. The term ST2 is also applied to the flip-flops AS and PE to set the flip-flops, so that the cycle may be reinitiated.

What is claimed is:

1. A digital incremental plotting system including:

a source of digital data for producing a succession of groups of coded instructions, each instruction forming a first character coded to represent a predetermined number of incremental steps along one axis and a second character coded to represent a predetermined number of incremental steps along a second axis;

incremental plotting means including a cathode-ray display tube having a display screen;

means coupled to said source and to said incremental plotting means and responsive to said first character of each such instruction to cause the cathode-ray beam in said cathode-ray tube to be deflected through a first predetermined number of incremental steps along said first axis, and responsive to said second character of each such instruction to cause said cathode-ray beam to be deflected through said second-mentioned predetermined number of incremental steps along said second axis, so as to display the plots corresponding to the aforesaid incremental steps in successive frames on said display screen; and a microfilm camera mounted in said system and optically coupled to said display screen in position to photograph the aforesaid plots appearing in said successive frames on said display screen so as to provide a microfilm record thereof.

2. The system defined in claim 1, in which said source comprises a magnetic tape unit including a magnetic tape, on which said characters are recorded in binary form across said tape and in respective channels thereof.

3. A digital incremental plotting system including:

a magnetic tape unit constituting a source of digital data for producing a succession of groups of coded instructions, each such instruction containing a first character coded to represent a predetermined number of incremental steps along one axis and a second character coded to represent a predetermined number of incremental steps along a second axis, said tape unit including a magnetic tape on which said characters are recorded across said tape in respective channels thereof;

incremental plotting means including a cathode-ray tube having a display screen, said cathode-ray tube including means for developing a cathode-ray beam therein which is deflectable across said display screen along a first axis and a second axis;

generating means coupled to said magnetic tape unit and to said incremental plotting means and responsive to said first character in each such instruction to cause said cathode-ray beam to be deflected across said screen through said first-mentioned predetermined number of incremental steps along said first axis, and responsive to said second character in each such instruction to cause said cathode-ray beam to be deflected across said screen through said second-mentioned predetermined number of incremental steps along said second axis, so as to display the plots corresponding to the aforesaid incremental steps in successive frames on said display screen; and a microfilm camera mounted in said system and optically coupled to said display screen in position to photograph the aforesaid plots appearing in said successive frames on said display screen so as to provide a microfilm record thereof.

4. The system defined in claim 3, in which each of said groups of instructions is designated by a predetermined address and in which each such address is identified by a distinctive identifier, both said address and said identifier being recorded as multi-bit binary characters across said tape and in respective channels thereof; and which includes address register means; sensing means coupled to said tape; and control circuit means including address decoder circuit means coupled to said identifier for enabling said sensing means to introduce successive addresses sensed from said tape into said address register means.

5. The system defined in claim 4, and which includes manually controllable means for establishing a desired address; comparator means coupled to said manually controllable means and to said address register means for providing an indication when the address in said register means matches said desired address; and tape control means coupled to said comparator for controlling the mode of movement of said tape in response to such indication from said comparator.

* * * * *